United States Patent [19]

Knight, Jr.

[11] 4,064,866

[45] Dec. 27, 1977

[54] FLAT PLATE SOLAR HEAT COLLECTOR

[75] Inventor: Philip A. Knight, Jr., Concord, Mass.

[73] Assignee: Raytheon Company, Lexington, Mass.

[21] Appl. No.: 689,608

[22] Filed: May 24, 1976

[51] Int. Cl.² ............................................. F24J 3/02
[52] U.S. Cl. .................................. 126/271; 165/49; 165/171; 165/172
[58] Field of Search ............... 126/270, 271; 237/1 A; 165/49, 171, 172; 138/103, 107, 108; 248/49, 65

[56] References Cited

U.S. PATENT DOCUMENTS

| 2,736,406 | 2/1956 | Johnson | 165/171 |
| 3,227,153 | 1/1966 | Godel et al. | 126/271 |
| 3,972,317 | 8/1976 | Gallagher | 126/271 |

FOREIGN PATENT DOCUMENTS 2,145,092  3/1973  Germany .......................... 165/171

Primary Examiner—Kenneth W. Sprague
Assistant Examiner—James C. Yeung
Attorney, Agent, or Firm—Harold A. Murphy; Joseph D. Pannone; John T. Meaney

[57] ABSTRACT

A solar collector which comprises a panel including flat collector plates or absorbers interconnected by integral interfitting members which simultaneously support fluid-conducting tubing and retain the tubing in efficient heat-conductive relation with the plates whereby heat absorbed by the plates may be efficiently transferred to the circulating fluid in the tubing.

7 Claims, 4 Drawing Figures

FLAT PLATE SOLAR HEAT COLLECTOR

BACKGROUND OF THE INVENTION

This invention relates to solar heat collectors and has particular reference to flat plate collectors adapted to be located in a position to intercept and absorb solar radiation and to transfer the resultant heat to a fluid circulating within suitable conduits associated with the collectors.

In some cases the conduits comprise water-conducting tubes which are formed in an aluminum panel by means of roll bonding. In other instances copper tubes of generally rectangular cross-sectional configuration are clamped to a copper sheet or plate.

It is highly desirable that copper tubing be used if possible since such tubing can be connected directly into a heating or water system, or the like, whereas collectors using aluminum, steel, or the like for the collector tubes require the use of an intermediate heat exchanger to isolate the collector from system impurities and corrosion.

Obviously, it is advantageous to employ copper tubing also because the requirement for accessory or corrective components or apparatus and complicated technical fabricating methods adds considerably to the overall cost of a solar heat collecting system. For example, the clamping of tubing to a collector plate requires additional structure. Brazing of copper tubing to copper plates requires large furnaces and high technology processing and may create undesirable stresses in the resultant panel.

SUMMARY OF THE INVENTION

The present invention contemplates a solar heat collector including a panel which comprises a number of collector plates disposed in edge-to-edge relation and interconnected by semicircular members formed integrally with the edges of adjacent plates. The members of each plate are adapted to nest within the members of an adjacent plate so as to jointly define a cylindrical tunnel-like configuration into which are inserted the water-carrying pipes or tubing.

In such a structure the insertion of the tubing effectively locks the plates together, and longitudinal lips interconnecting the ends of the members on each plate prevent spreading apart of the plates. Also, the structure provides broad area heat-conductive engagement between the members and tubing whereby heat from the plates will be effectively transmitted from the plates to the fluid in the tubing.

BRIEF DESCRIPTION OF THE DRAWINGS

The above and other objectives of the invention will become apparent from the following description taken in connection with the accompanying drawings, wherein.

DESCRIPTION OF THE PREFERRED EMBODIMENT

Figure 1:
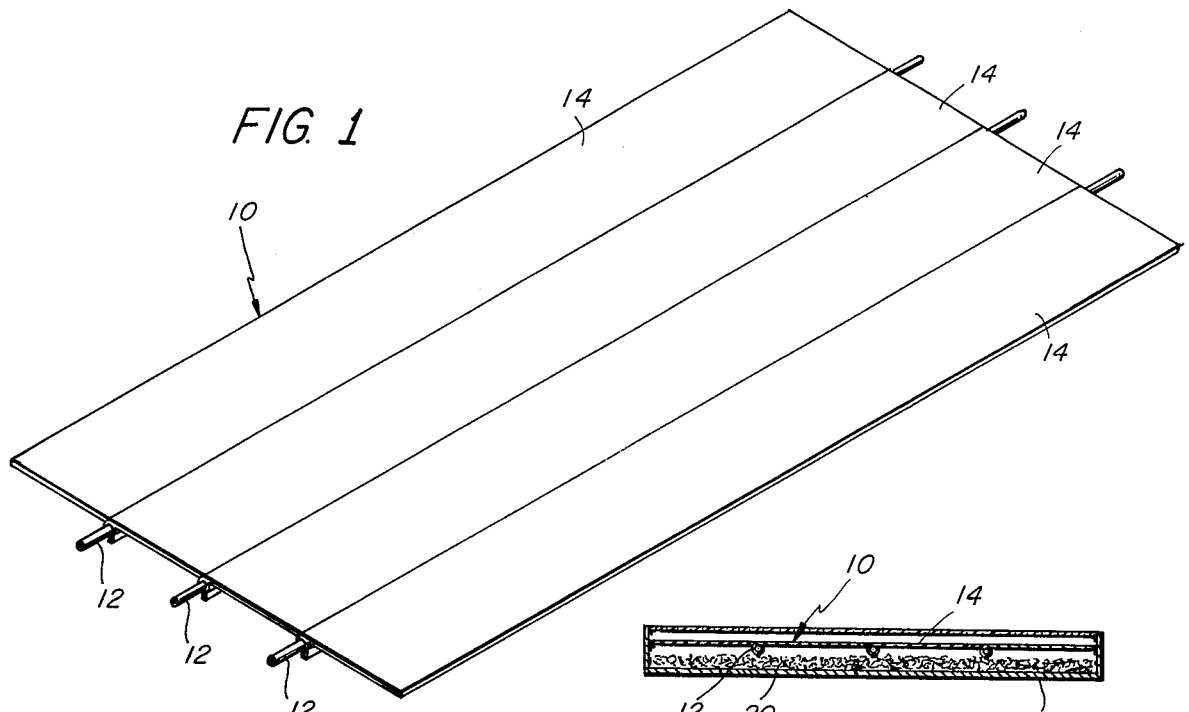
FIG. 1 is an isometric view of a solar heat collecting panel embodying the invention.
Figure 2:
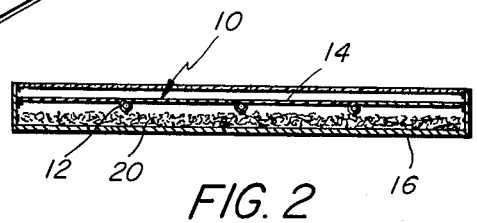
FIG. 2 is a horizontal sectional view of an assembled solar collector utilizing a panel embodying the present invention.
Figure 3:
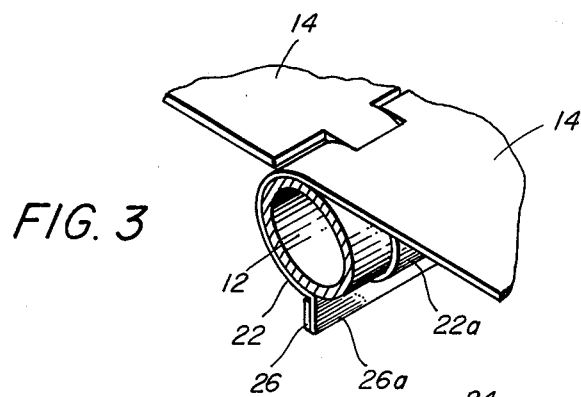
FIG. 3 is an enlarged end view of a portion of the panel of FIG. 1 showing particularly the connection between the collecting plates and the fluid-connecting tubing.

Referring more particularly to the drawings wherein like characters of reference designate like parts throughout the several views, there is shown in FIG. 1 the essential elements of a solar heat collector, including a panel 10 and fluid-conducting pipes or tubing 12. The panel 10 comprises a number of collecting plates 14 disposed to lie substantially in a single plane and in edge-to-edge relation as shown.

The collector plates 14 may be of any suitable material which will absorb and conduct heat when subjected to solar radiation. Aluminum, steel and copper are among the many materials particularly suitable for the purpose. The plates may have their upper surface coated or painted with any suitable black material to provide high heat absorption.

As is well known, a coil of tubing 12 or arrangement of pipes is located in heat-conducting relation to the plates and conducts a flow of water or other fluid which becomes heated when heat is generated in the plates 14 by solar radiation and is transmitted through the walls of the tubing 12 to the fluid. Such heated fluid may be utilized for domestic use, such as for heating a building, heating hot water for in-house use, heating water in a swimming pool, or for other selected uses as desired.

The assembled panel 10 may be located in a suitable box or tray 16 as is well known, which box has an open upper side covered by a transparent pane 18 whereby solar radiation may pass to the collector plates 14 of the panel 10. Insulating material 20 may be placed in the box beneath the panel to restrict loss of heat in a downward direction while the transparent pane 18 prevents escape of any substantial amount of heat in an upward direction.

Figure 4:
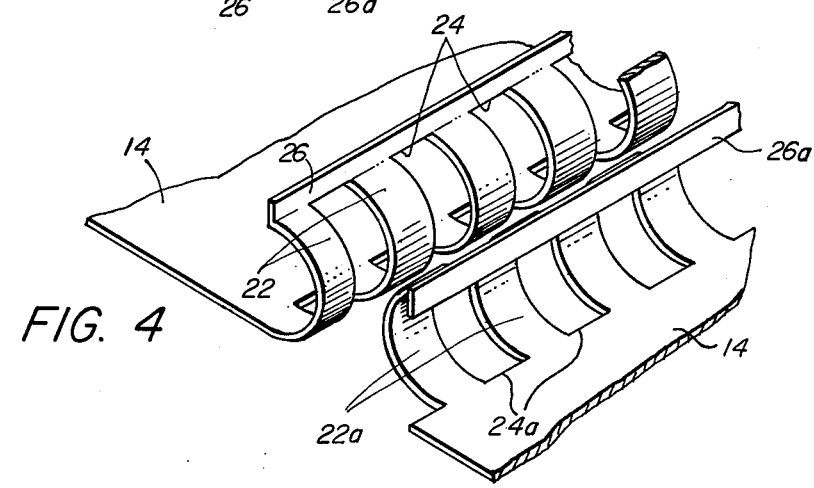
FIG. 4 is an inverted end view of a pair of collecting plates showing the tube-supporting members thereon.

The tubing 12 is preferably disposed on the under side of the panel 10 and retained thereon in good heat-conducting relationship which is achieved, according to this invention, by semicircular gripping members 22 on the edge of the plates 14 (FIG. 4) which members 22 are spaced apart as shown so as to interfit with similar members 22a formed on adjacent plates 14.

The members 22 and 22a are formed by providing slots 24 and 24a in the plates and rolling the slotted edges into a semi-circular configuration as shown. It will be seen that the slots 24–24a are disposed perpendicular to the edges of the respective plates but do not extend all the way to the edges of the plates, rather terminating short of the edges so as to leave longitudinally extending lips 26 and 26a which are bent so as to be disposed perpendicular to the planes of the respective plates 14.

Thus, one plate is assembled with another by inserting one set of members 22 into the slots 24a between the members 22a on the other plate, and then sliding the plates toward one another until the lips 26 and 26a abut. The members 22 and 22a then define a cylindrical or tubular opening extending longitudinally of the plates 14, beneath their adjacent edges, into which a section of tubing 12 may be inserted. The insertion of the tubing essentially locks the plates 14 together since the abutting lips 26–26a prevent expansion of the cylindrical opening.

After insertion of the tubing the assembly may be jigged to ensure a substantially flat panel, and the tubing may be expanded by any suitable means such as a bullet, hydraulic or steam pressure, differential heating, or the like. The resultant assembled panel will be substantially rigid and efficient heat conduction from absorber plate to fluid is achieved.

Any number of plates 14 may be utilized to form a panel 10. The plates 14 may be formed of any suitable high thermal conductivity material which does not have to be similar to the tubing material. For example, sheet steel has inherently low cost and does not require complex tooling or preparation. Standard copper tubing may be used and no large furnaces for brazing and no high technology processing are required. Thus, a low cost panel may be made according to this invention.

From the foregoing it will be apparent that all of the objectives of this invention have been accomplished by the structure shown and described. It will be apparent, however, that various modifications and changes may be made by those skilled in the art without departing from the spirit of the invention as expressed in the accompanying claims. Therefore, all matter shown and described is to be interpreted as illustrative and not in a limiting sense.

What is claimed is:

1. A solar heat collector for heating a fluid, comprising an open-topped container, a panel in said container positioned to be contacted by solar radiation entering the container through the open top, said panel comprising a number of collector plates disposed substantially in edge-to-edge relation in a common plane, fluid-conducting conduit disposed in engagement with said panel along adjoining edges of said plates, and gripping means on said plates encircling adjacent sections of said conduit for retaining the conduit in efficient heat-conducting relation with the plates, said gripping means comprising slotted areas disposed in each plate adjacent an adjoining edge and defining gripping members therebetween, the gripping members of a respective plate being interlocked with gripping members on an adjacent plate and defining therewith a channel within which said conduit is located, and a transparent cover disposed over the open top of the container and transmissive to solar radiation.

2. A solar heat collector as set forth in claim 1 wherein said gripping members are shaped to substantially semicircular configurations and are disposed in closely encircling relation to said conduit.

3. A solar heat collector as set forth in claim 2 wherein said gripping members on each respective plate are connected together by an integral lip, which lips on adjacent plates abut.

4. A collector plate for a solar heat collector panel, comprising a substantially flat sheet of good thermal conductivity material, said sheet having at least one edge portion formed to a reversely curved semicircular configuration, said edge portion having a series of perforations therein spaced at intervals throughout the length thereof, said perforations being slots which extend perpendicular to the adjacent edge of the sheet, said slots terminating in spaced relation to the adjacent edge of the sheet to form an unbroken edge portion on said sheet, which edge portion is bent to form a lip directed outwardly from said semicircular portion.

5. A collector panel for a solar heat collecting device, comprising at least two substantially flat collector plates of good heat conductive material disposed in a common plane in edge-to-edge relation, said plates having their adjacent edge portions formed to a reversely curved semicircular configuration and having a series of perforations therein spaced at intervals throughout the length of said edge portions to form gripping members between the perforations, the gripping members of one plate being disposed within aligned perforations in the adjacent plate whereby the gripping members of the two adjacent plates form a channel extending parallel with the adjacent edges of the plates.

6. A collector panel as set forth in claim 5 wherein a section of fluid-conducting tubing is disposed with said channel with the gripping members being disposed in heat-conductive relation with the outer surface of the tubing.

7. A collector panel as set forth in claim 6 wherein said perforations are slots which extend perpendicular to the adjacent edge of the respective plates and terminate in spaced relation to the respective edge to form an unbroken lip extending along said respective edge, the lips on adjacent plates abutting to form means for preventing mechanical expansion of the channel.

* * * * *